US007730352B2

(12) United States Patent
Marquardt et al.

(10) Patent No.: US 7,730,352 B2
(45) Date of Patent: Jun. 1, 2010

(54) TESTING NETWORK APPLICATIONS WITHOUT COMMUNICATING OVER A NETWORK LAYER COMMUNICATION LINK

(75) Inventors: Thomas L. Marquardt, Seattle, WA (US); Andres M. Sanabria, Sammamish, WA (US); Dmitry Robsman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 11/478,178

(22) Filed: Jun. 28, 2006

(65) Prior Publication Data

US 2008/0005613 A1 Jan. 3, 2008

(51) Int. Cl.
*G06F 11/00* (2006.01)
(52) U.S. Cl. .......................................... 714/27; 709/219
(58) Field of Classification Search .................... 714/27
See application file for complete search history.

(56) References Cited

U.S. PATENT DOCUMENTS

| | | | | | |
|---|---|---|---|---|---|
| 5,951,645 | A | * | 9/1999 | Goto | 709/230 |
| 5,958,006 | A | * | 9/1999 | Eggleston et al. | 709/219 |
| 6,044,398 | A | * | 3/2000 | Marullo et al. | 709/219 |
| 6,061,725 | A | * | 5/2000 | Schwaller et al. | 709/224 |
| 6,185,701 | B1 | * | 2/2001 | Marullo et al. | 714/38 |
| 6,397,359 | B1 | * | 5/2002 | Chandra et al. | 714/712 |
| 6,434,513 | B1 | | 8/2002 | Sherman et al. | |
| 6,477,483 | B1 | | 11/2002 | Scarlat et al. | |
| 6,697,964 | B1 | * | 2/2004 | Dodrill et al. | 714/38 |
| 6,799,213 | B1 | | 9/2004 | Zhao et al. | |
| 6,832,184 | B1 | | 12/2004 | Bleier, Jr. et al. | |
| 6,993,747 | B1 | | 1/2006 | Friedman | |
| 2002/0066073 | A1 | | 5/2002 | Lienhard et al. | |
| 2002/0161553 | A1 | | 10/2002 | Har'El et al. | |
| 2003/0120463 | A1 | * | 6/2003 | Cox et al. | 702/186 |
| 2003/0231741 | A1 | * | 12/2003 | Rancu et al. | 379/9 |
| 2004/0111727 | A1 | | 6/2004 | Schwarzbauer et al. | |
| 2004/0172253 | A1 | | 9/2004 | Singh | |
| 2006/0117055 | A1 | * | 6/2006 | Doyle | 707/102 |

OTHER PUBLICATIONS

Benedikt,Michael, et al,"VeriWeb: Automatically Testing Dynamic Web Sites",http://wwwconf.ecs.soton.ac.uk/archive/00000230/01/.
ACM Portal,"The Georgia Tech Network Simulator",https://portal.acm.org/poplogin.cfm? dl=ACM&coll=GUIDE&comp_id=944775&want_href=delivery%2Ecfm%3Fid%3D944775%26type%3Dpdf&CFID=.
Rizzo,Luigi,"Dummynet: a simple approach to the evaluation of network protocols",http://delivery.acm. org/10.1145/260000/251012/p31-rizzo.pdf? key1=251012&key2=8447643411&coll=GUIDE&dl=GUIDE&CFID=6824.

(Continued)

*Primary Examiner*—Joshua A Lohn
*Assistant Examiner*—Kamini Patel

(57) ABSTRACT

Techniques and technologies are provided for testing network applications without communicating over a network layer communication link. For example, in one implementation, a system for testing network applications within a process is provided which includes at least one client user instance (CUI) module configured to execute in the process, a performance testing engine module (PTEM) configured to execute in the process, and a network application module configured to execute in the process. The CUI module has state information associated therewith. The PTEM includes a Request Driver Module (RDM) which generates information requests based on the state information received from the CUI. The network application module generates responses to the information requests.

20 Claims, 3 Drawing Sheets

OTHER PUBLICATIONS

Benedikt, Michael, et al., "VeriWeb: Automatically Testing Dynamic Web Sites", In Proceedings of 11th International World Wide Web Conference, ACM Press (May 2002), available at http://wwwconf.ecs.soton.ac.uk/archive/00000230/01/.

Riley, George, "The Georgia Tech Network Simulator", Proceedings of the ACM SIGCOMM 2003 Workshops, (Aug. 2003), available at https://portal.acm.org/poplogin.cfm? dl=ACM&coll=GUIDE&comp_id=944775&want_href=delivery%2Ecfm%3Fid%3D944775%26type%3Dpdf&CFID=68244897&CFTOKEN=70927719&td=1143466956562.

Rizzo, Luigi, "Dummynet: A Simple Approach to the Evaluation of Network Protocols", ACM SIGCOMM Computer Communication Review (Jan. 1997), available at http://delivery.acm.org/10.1145/260000/251012/p31-rizzo.pdfkey1=251012&key2=8447643411&coll=GUIDE&dl=GUIDE&CFID=68244958&CFTOKEN=65645901.

* cited by examiner

TESTING NETWORK APPLICATIONS WITHOUT COMMUNICATING OVER A NETWORK LAYER COMMUNICATION LINK

BACKGROUND

Testing of network applications, such as, Web server applications and database applications, traditionally involves setting up a private network of several computers. For instance, in a traditional testing environment, a network application is hosted on a server and is separate from a client browser process running on another separate computer or a number of client browser processes running on separate computers. The application communicates with client browser application(s) via a network layer over a network communication link. Thus, these approaches for testing network applications involve setting up a network including a large number of physical machines each running its own process.

SUMMARY

Techniques and technologies are provided for testing network applications without communicating over a network layer communication link. According to one implementation, a performance testing system or environment is provided in which allows a network application to directly communicate with a client user instance thereby allowing communications which normally take place over a network or network layer to be eliminated. A "network application" refers to any application which is capable of communicating with another application over or across a network. A network application can be deployed on a server and exposed to requests from a client) Among other benefits, the testing environment can allow developers of applications to test and debug the applications without setting up an actual network of multiple different machines (e.g., client-side computers and a Web server connected together over a networked communication link). The types of testing can vary depending on the application but can include load testing, responsiveness testing, etc. As such performance testing can be greatly simplified since it occurs on a single computer machine.

In this scenario in-process function calls take place within a single machine without traversing or being communicated over a network communication link or network layer. In other words, function calls can be made directly into a function without a network layer being present. The server functionality can be provided within the same process as a number of client user instances. Using in-process function calls allows network layer communications to be eliminated. Since function calls to the network application are "in-process" function calls, the network application almost immediately receives requests since the requests do not travel across a network layer communication link. In other words, requests to the network application can be made without traversing over a network. Removing the network layer from the testing process allows network variations which typically occur as a request is being transmitted over a network communication link to be eliminated. This tool allows a developer to determine how the application is performing regardless of the variations in the particular network.

In one implementation of these techniques and technologies, a system for testing network applications within at least one process is provided which includes at least one client user instance (CUI) module configured to execute in the process, a performance testing engine module (PTEM) also configured to execute in the same process, and a network application module configured to also execute in the same process. Alternatively, in another implementation, the CUI module, PTEM and network application module could execute in different processes on the same computer. The CUI module has state information associated therewith. The PTEM includes a Request Driver Module (RDM) which generates information requests based on the state information received from the CUI. The network application module generates responses to the information requests.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The techniques and technologies for testing a network application are further described with reference to the accompanying drawings in which.

DETAILED DESCRIPTION

The following detailed description is merely exemplary in nature and is not intended to limit the invention or the application and uses of the invention. As used herein, the word "exemplary" means "serving as an example, instance, or illustration." Any implementation described herein as "exemplary" is not necessarily to be construed as preferred or advantageous over other implementations. All of the implementations described below are exemplary implementations provided to enable persons skilled in the art to make or use the invention and are not intended to limit the scope of the invention which is defined by the claims.

Embodiments of the invention may be described herein in terms of functional and/or logical block components and various processing steps. It should be appreciated that such block components may be realized by any number of hardware, software, and/or firmware components configured to perform the specified functions. In addition, those skilled in the art will appreciate that embodiments of the present invention may be practiced in conjunction with any number of data transmission protocols and that the system described herein is merely one example embodiment of the invention.

For the sake of brevity, conventional techniques related to computer devices, application testing techniques, signal processing, data transmission, signaling, computer operating systems, network control, and other functional aspects of the systems may not be described in detail herein. Furthermore, the connecting lines shown in the various figures contained herein are intended to represent example functional relationships and/or logical couplings between the various elements. It should be noted that many alternative or additional functional relationships or logical connections may be present in alternative implementations of the invention.

Figure 1:
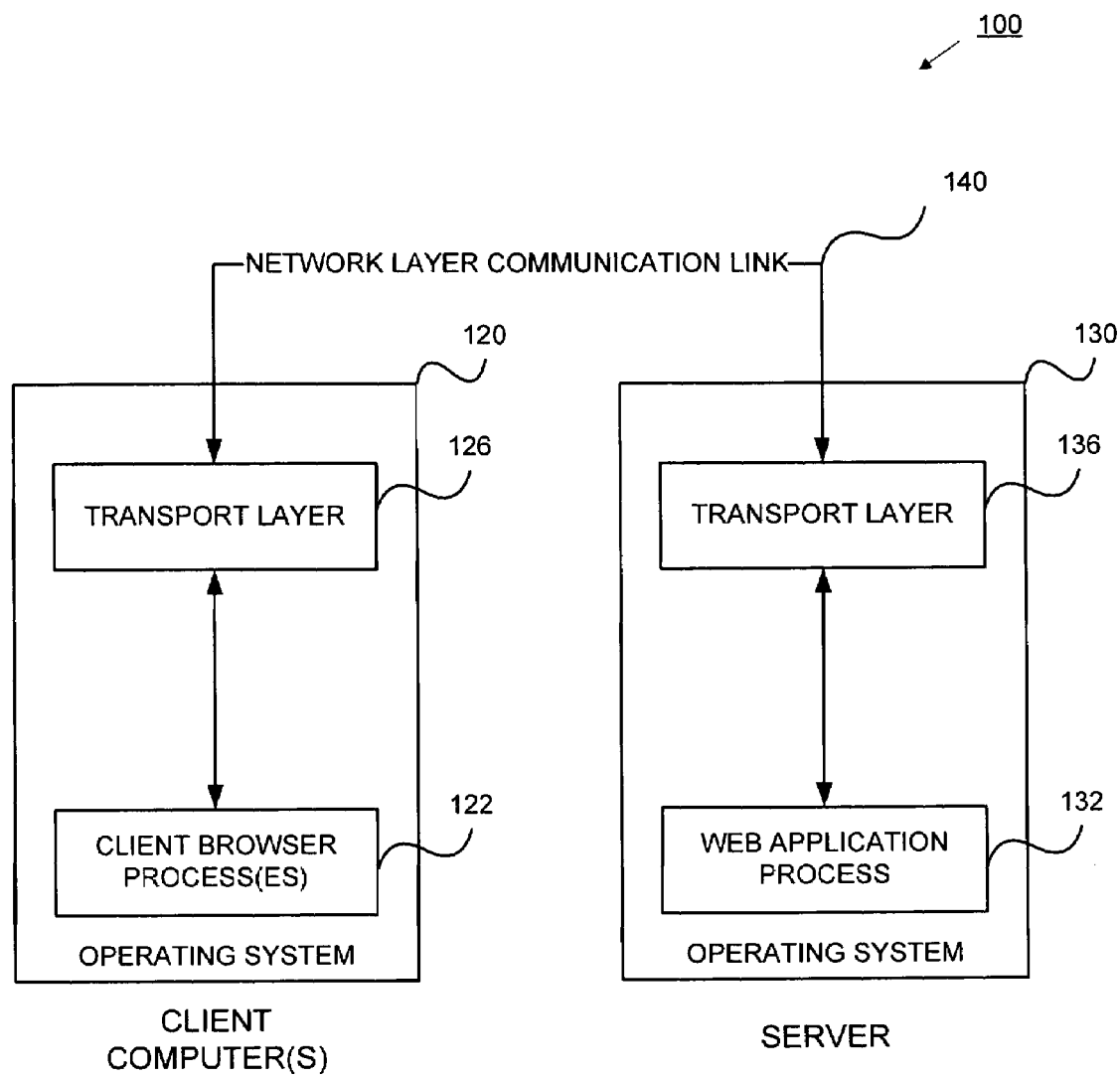
FIG. 1 is a simplified block diagram of a conventional Web server application testing environment which can be used to test a Web server application hosted on a Web server.

FIG. 1 is a simplified block diagram of a conventional Web server application testing environment 100 which can be used to test a Web server application hosted on a Web server 130. The performance-testing environment 100 comprises at least one client-side computer 120 and a Web server 130 which communicate with each other over a wired or wireless network communication link 140 using a network protocol such as HTTP, HTTPS, FTP, SMTP, IMAP, NNTP, SOAP, SSH, Telnet, etc. Although a single client-side computer 120 is shown it will be appreciated that in some conventional performance-testing environments, a network of multiple client-side computers 120 can be utilized to test applications located on the Web server 130.

As used herein, the term "web server" refers to a program that, using the client/server model and the World Wide Web's Hypertext Transfer Protocol (HTTP), serves the files that form Web pages to Web users (whose computers contain HTTP clients that forward their requests). Every computer on the Internet that contains a Web site must have a Web server program. Examples of Web servers include, for example, Internet Information Server (IIS)® from Microsoft®, Apache®, or other Web servers capable of operating with different types of Web server applications. Other examples of Web servers include Novell's Web Server for users of its NetWare operating system and IBM's family of Lotus Domino servers, primarily for IBM's OS/390 and AS/400 customers.

As used herein, the term "process" refers to an instance of a program running in a computer. A process starts when a program is initiated. A process is a running program with which a particular set of data is associated so that the process can be kept track of. An application that is being shared by multiple users will generally have one process at some stage of execution for each user. A process can initiate a subprocess, which is a called a child process (and the initiating process is sometimes referred to as its parent). A child process is a replica of the parent process and shares some of its resources, but cannot exist if the parent is terminated. Processes can exchange information or synchronize their operation through several methods of inter-process communication (IPC).

When a user process of the Web server application 132 starts on the operating system, various initialization steps which take place. For example, upon start up, the Web server application 132 reads a configuration file and begins listening to network traffic for requests, such as, HTTP requests from the transport layer 136. As used herein, the term "transport layer" refers to layer four of the seven layer OSI model. The transport layer responds to service requests from a session layer and issues service requests to the network layer. The transport layer provides transparent transfer of data between hosts or end users, thus relieving the upper layers from any concern with providing reliable and cost-effective data transfer. The transport layer is usually responsible for end-to-end error recovery and flow control, and ensuring complete data transfer. In the Internet protocol suite this function is most commonly achieved by the connection oriented Transmission Control Protocol (TCP). The datagram-type transport, User Datagram Protocol (UDP), provides neither error recovery, nor flow control, leaving these functions to the application.

The operating system of the client-side computer 120 hosts at least one client browser user process or application 122. As used herein, the term "browser" generically refers to user interfaces that let a user browse or navigate through content. As used herein, the term "web browser" refers to an application program that provides a way to look at and interact with information on the World Wide Web. A Web browser is a client program that typically uses the Hypertext Transfer Protocol (HTTP) to make requests for information to Web servers throughout the Internet on behalf of the browser user. Examples of Web browsers include Mosaic®, Netscape Navigator®, Microsoft Internet Explorer®.

The network layer 140 is a kernel driver that is part of the operating system in both the client computer(s) 120 and the server 130. As used herein, the term "network layer" refers to level three of the seven level OSI model. The network layer responds to service requests from the transport layer 136 and issues service requests to the data link layer (not shown). The network layer is responsible for delivery or transferring of information from a source to a destination via one or more networks while maintaining the quality of service requested by the transport layer 126. The network layer performs network routing, flow control, network segmentation/de-segmentation, and error control functions. For example, the network layer addresses messages and translates logical addresses and names into physical addresses. The network layer also determines the route from the source to the destination computer and manages traffic problems, such as switching, routing, and controls the congestion of data packets.

The Web server 130 hosts the Web application 132. The Web server 130 knows how to interface with the transport layer 136 and the Web application 132. The Web application 132 only knows how to interface with the Web server 130. The Web server 130 and Web application 132 communicate across a hosting interface, such as ISAPI or CGI.

Once the Web application user process 132 is started, the client browser user process 122 can generate and send HTTP requests across the network layer communication link 140 via the transport layer 126. The client browser user process 122 generates HTTP requests that are communicated to the transport layer 126 over a hosting interface which allows the client browser user process(es) to interact with the transport layer 126. For instance, if a user makes a request to a Web site using a browser 122 such as Internet Explorer®, this request travels across the network communication link 140 and is received by a server 130 hosting the Web application 132. The Web application user process 132 gets executed in response to the network request.

Among other functions, the network layer 140 of the client computer 120 hands the HTTP requests to the network layer 140 of the server 130, and the network layer 140 of the server 130 passes the HTTP requests to the transport layer 136. The operating system of the server 130 hosts the Web server application 132 which is being tested. The transport layer 136 of the server 130 receives the HTTP requests transmitted from client computer 120 over the network layer communication link 140, and provides these HTTP requests to the Web server application 132 via a hosting interface. In other words, the Web server 130 makes function calls into the Web server application 132 via the hosting interface. The Web server application 132 processes the function calls, and then responds to these HTTP requests by sending back response information to the Web server 130 which in turn sends information back to the client browser 122 running on the client computer 120 over the network layer communication link 140.

Alternatively, some performance testing tools used in Web site development, can allow multiple client browser processes 122 to be simulated to test a Web server application 132. In other words, a Web server application and client browser application(s) can be implemented in the same computer, and these different applications communicate with each other over a network layer communication link 140. For example, a performance testing tool called Mercury LoadRunner™ is a performance and load testing product for examining system behavior and performance, while generating actual load. LoadRunner™ can emulate hundreds or thousands of concurrent users to put the application through the rigors of real-life user loads, while collecting information from key infrastructure components (web servers, database servers etc). The results can then be analyzed in details, to explore the reasons for particular behavior. LoadRunner™ can simulate HTTP requests from a number of client browser applications. These HTTP requests are communicated over a network layer communication link 140 to the Web server application which is hosted on the same computer. Nevertheless, any performance testing using these tools requires setting up a private network (e.g., any testing that takes place will still take place over a network layer communication link 140).

Thus, in either case described above, the Web server application and client browser application(s) are implemented as separate processes which communicate with each other over a network layer communication link 140. One drawback of using these approaches for testing a Web server application is that at least two user processes are involved (e.g., one at the client browser application and another at the Web server application). These approaches also require expensive hardware, and setting up a network including a large number of physical machines (e.g., a Web server, a backend SQL server, and a large number of client machines that issue requests to the Web server). Since multiple computers and/or processes are involved testing a Web server application using these approaches can be time consuming to configure and set up. For example, the various machines which are part of the network require a private network in order to isolate each process from other network traffic, and to ensure availability of necessary bandwidth. This prevents Web application developers from conducting their own testing prior to making a change to their software. Moreover, traffic on the network can introduce variability and affect the speed at which requests travel across the network.

Figure 2:
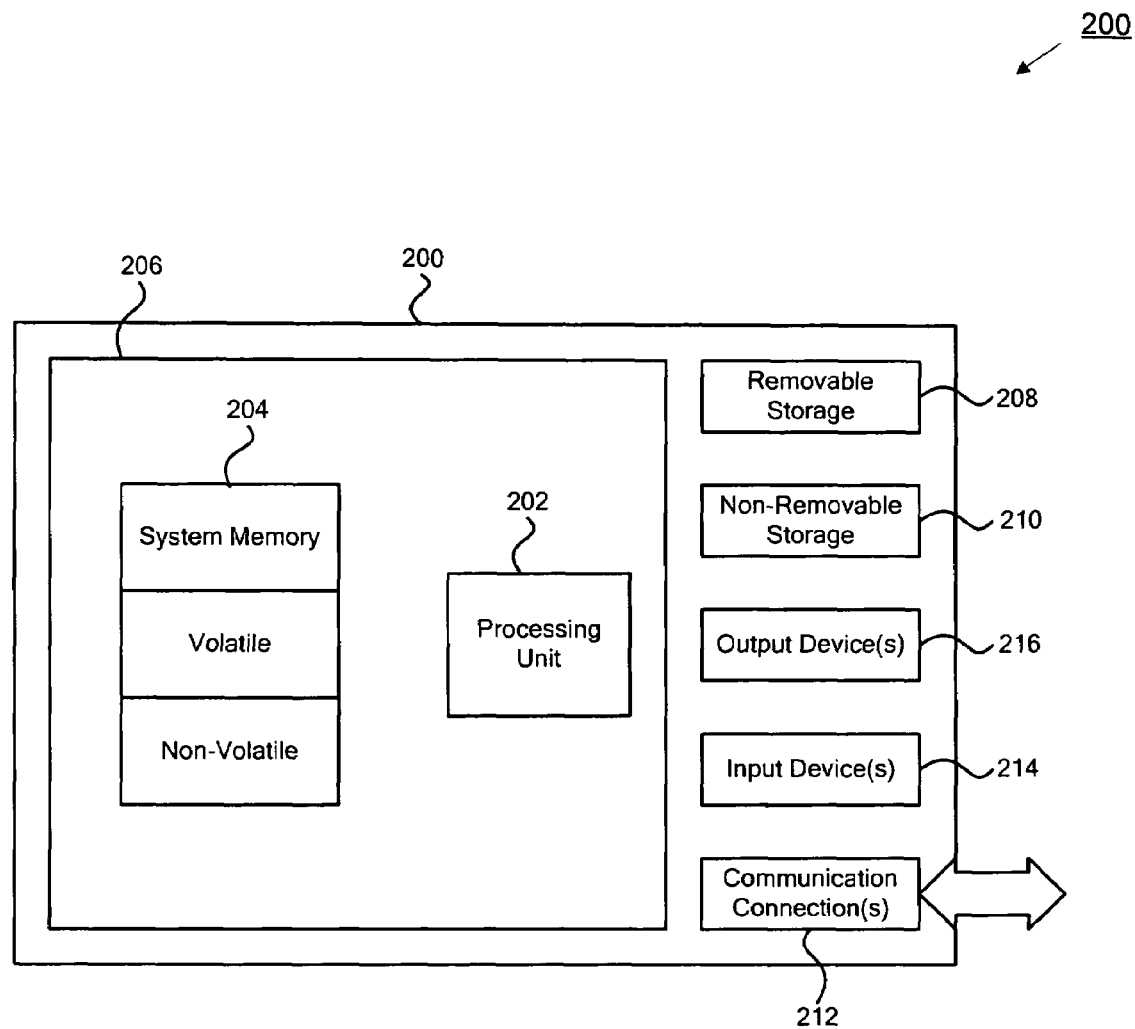
FIG. 2 is a simplified block diagram of an exemplary computer system.

FIG. 2 is a simplified block diagram of an exemplary computer system 200. Computer system 200 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, personal digital assistants, mobile telephones, multiprocessor systems, microprocessor-based systems, programmable consumer electronics, network PCs, minicomputers, mainframe computers, distributed computing environments that include any of the above systems or devices, and the like.

Computer system 200 and certain aspects of embodiments of the invention may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Computer system 200 typically includes at least some form of computer readable media. Computer readable media can be any available media that can be accessed by computer system 200 and/or by applications executed by computer system 200. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer system 200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Referring again to FIG. 2, in its most basic configuration, computer system 200 typically includes at least one processing unit 202 and a suitable amount of memory 204. Depending on the exact configuration and type of computing system 200, memory 204 may be volatile (such as RAM), non-volatile (such as ROM, flash memory, etc.) or some combination of the two. This most basic configuration is identified in FIG. 2 by reference number 206. Additionally, computer system 200 may also have additional features/functionality. For example, computer system 200 may also include additional storage (removable and/or non-removable) including, but not limited to, magnetic or optical disks or tape. Such additional storage is illustrated in FIG. 2 by removable storage 208 and non-removable storage 210. Memory 204, removable storage 208, and non-removable storage 210 are all examples of computer storage media as defined above.

Computer system 200 may also contain communications connection(s) 212 that allow the system to communicate with other devices. Communications connection(s) 212 may be associated with the handling of communication media as defined above.

Computer system 200 may also include or communicate with input device(s) 214 such as a keyboard, mouse or other pointing device, pen, voice input device, touch input device, etc. In the example embodiment described below, input device(s) includes a standard pointing device (e.g., a mouse, a trackball device, a joystick device, a touchpad device, or any type of pointing device) that generates standard pointing device messages for processing by computer system 200. Computer system 200 may also include or communicate with output device(s) 216 such as a display, speakers, printer, or the like. All of these devices are well know in the art and need not be discussed at length here.

Figure 3:
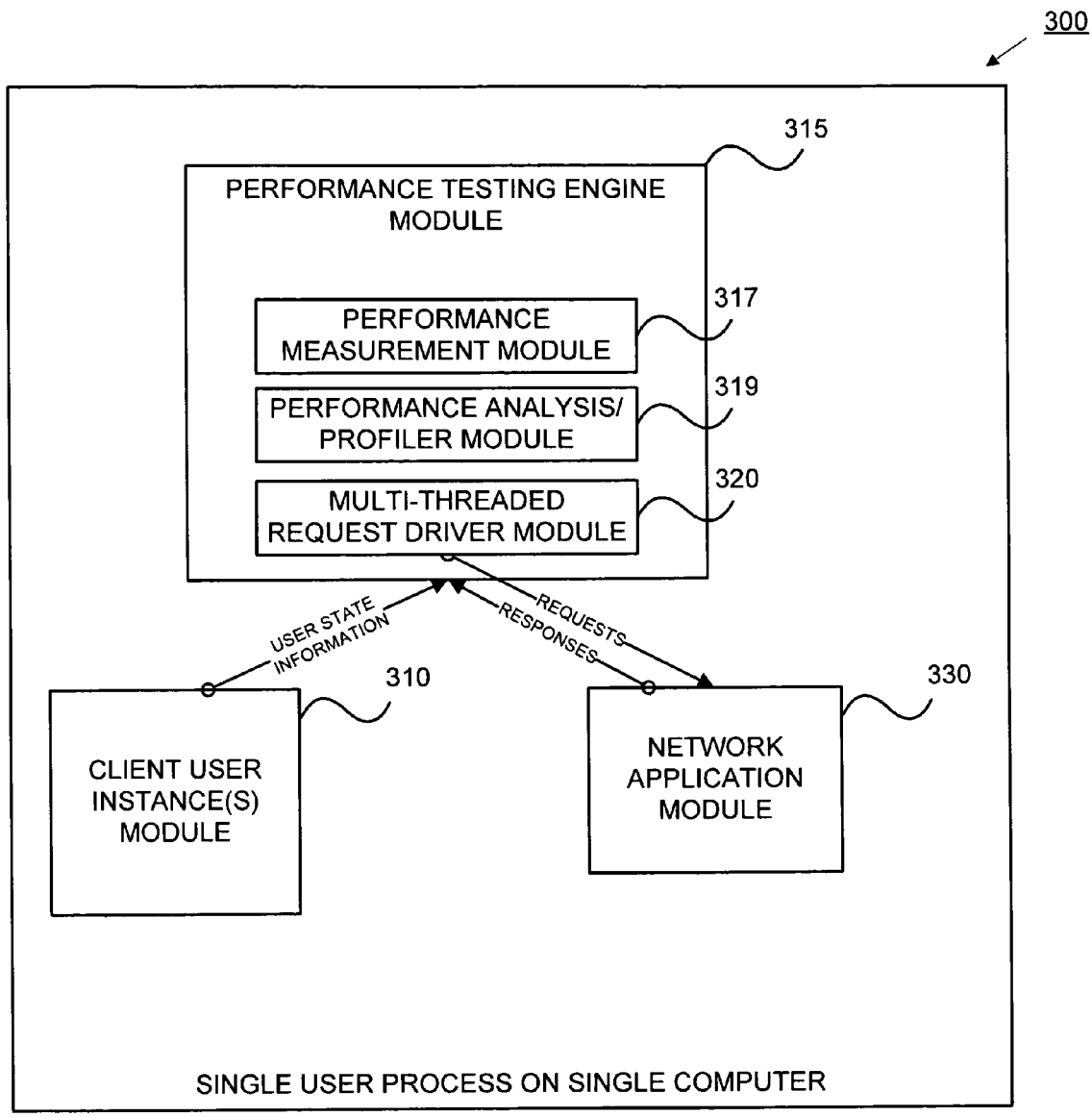
FIG. 3 is a simplified block diagram of an exemplary application testing environment in which network applications are tested within a single process on a computer.

FIG. 3 is a simplified block diagram of an exemplary network application testing environment 300 in which network applications are tested within the same, single process on the same computer. It will be appreciated that while the description below describes a testing environment 300 in which network applications are tested within a single process on the same computer, in other implementations, network applications can be tested by executing using different processes on the same computer.

The application testing environment 300 comprises a performance testing engine module (PTEM) 315 including a Performance Measurement Module (PMM) 317, a Performance Analysis Module (PAM) 319, and a multi-threaded Request Driver Module (RDM) 320, at least one client user instance (CUIs) 310 (e.g., client browser user instances (CBUIs)), and a network application 330 loaded via a hosting interface.

As used herein, the term "application" refers to an application program designed to perform a specific function directly for a user or, in some cases, for another application program. Examples of applications include database programs, Web browsers, development tools, and communication programs. Applications use the services of a computer's operating system and other supporting applications. The formal requests and means of communicating with other programs that an application program uses is called the application program interface (API). As used herein, a "network application" refers to an application which is configured to communicate with another application over a network layer communication link. A network application can be deployed on a server that can be exposed to requests from a client. A network application may comprise any interactive application program which is capable of receiving requests for information from a client application over a network layer communication link when operating in a normal manner. Examples of network applications include, for example, Web server applications, database applications, e-mail applications, Telnet applications, Remote Desktop Protocol (RDP) applications, and other applications which are capable of receiving requests over a network communication link or network layer.

In this exemplary implementation, the network application 330 and CUIs 310 are implemented as part of a single user process on a single computer (e.g., the network application 330 and the CUIs 310 can be executed as part of the same process within the same computer). This eliminates the need for transferring all of the user state information over a network layer communication link since communication between the network application 330 and CUIs 310 takes place within a single user process. As such, network application testing that would normally take place using a network application which communicates with client(s) user instances via a network protocol over an external network such as an intranet, the Internet, etc. can be simulated without implicating a network layer communication link. Implementing the network application 330 and the CUIs 310 within the same process greatly simplifies testing of network applications by eliminating the need for setting up a network between the network application and the client(s) user instances. These techniques can be useful, for example, in Rapid Application Development (RAD) environments since the techniques make it easy for developers to start, run, and quickly test their code using a simple, quick application locally on their computer.

Each client user instance (CUI) 310 generates network addressable request information (e.g., a number of URLs and other data to be sent in the requests), and provides this information to the RDM 320 of the PTEM 315. Each CUI 310 has a particular user state associated with it which can be provided to the RDM 320. In other words each CUI 310 does not act as a regular client browser application. Rather each CUI 310 has a particular user state which can be used to simulate usage patterns of a client browser application as a user makes requests to a network application on a server. The user state associated with each of the CUIs 310 can be either the same or different. The number of CUIs 310 can be varied depending on the nature of the testing that is taking place. For example, if the testing process is intended to simulate testing of a network application 330 which would be deployed on a server or database that receives a large volume of user requests, then hundreds or even thousands of different CUIs 310 could be implemented to simultaneously provide different state information to the RDM 320. On the other hand, if the testing process is intended to simulate testing of a network application 330 which would be deployed on a server or database that receives a smaller volume of user requests, then fewer (e.g., one or more) different CUIs 310 could be implemented to simultaneously provide different state information to the RDM 320.

The PTEM 315 drives the entire system 300 and comprises the RDM 320. The RDM 320 is multi-threaded meaning that it can simultaneously receive state information from a number of different CUIs 310, and process that state information. For example, if there are ten different CUIs 310, then the RDM 320 can be instantiated with ten different threads meaning that the RDM 320 can simultaneously handle state information from the ten different CUIs 310 at a given time. The number of threads can be dynamically expanded or reduced depending on the number of CUIs 310 appropriate in a given testing scenario or pattern.

The RDM 320 receives the "static" state information (e.g., lists of URLs, database queries, etc.) from each of the different CUIs 310, generates requests corresponding to this state information (e.g., HTTP requests, database requests over the Tabular Data Stream (TDS) protocol, a request to obtain a file via a File Transfer Protocol (FTP), an email message sent via Simple Main Transfer Protocol (SMTP)), and determines the order in which the requests will be sent to the network application 330.

The testing environment 300 described herein can be applied to test any network application 330. As noted above, a "network application" is an application which is capable of receiving requests from another application over a network layer communication link. For instance, if the network application 330 comprises a Web server application, and the CUIs 310 comprises a client browser user instances (CBUIs), then the RDM 320 can read configuration information for CBUI #1 which can comprise, for example, a list of, URLs and other information which a browser would typically send to a Web server as part of an HTTP request. This other information can include, for example, cookies, session IDs, authentication headers, data posted back to the server (e.g., a previous response may have contained a form, which the "user" (CUI) has filled out and submitted back to the web application), etc. In an exemplary testing scenario where there are two CBUIs (CBUI #1 and CBUI#2), the RDM 320 can read a first URL in a first list of URLs associated with CBUI#1, generate a first HTTP request corresponding to the first URL, and communicate the first HTTP request to the network application 330 indicating that the network application 330 should provide a response to the first HTTP request. This process can be repeated for each of the URLs in the first list. Simultaneously, the RDM 320 can read a first URL in a second list of URLs associated with CBUI#2, generate another HTTP request, and communicate the HTTP request to the network application 330 indicating that the network application 330 should provide a response to this HTTP request. This process can be repeated for each of the URLs in the second list.

The network application 330 runs differently than it would in a traditional testing environment. The network application 330 automatically reads configuration information for 310, reads configuration information about the network application 330, and starts executing code which tells the network application 330 what to do with the different requests provided from the RDM 320. In response to the requests from the RDM 320, the network application 330 generates responses and sends the responses to the PTEM 315.

The network application 330 can be loaded via a hosting interface that usually resides between the application layer and the transport layer. Exemplary hosting interfaces include the Internet Server Application Programming Interface (ISAPI)®, a common gateway interface (CGI), a hosting interface configured to operate with ASP.NET applications, or other known hosting interfaces which allow for communication between the transport layer and application layer. Of the hosting interfaces mentioned above, ISAPI is a set of Windows program calls that allow a Web server application to be written so that will run faster than a common gateway interface (CGI) application. Using ISAPI, a dynamic link library (DLL) application file can be created that can run as part of the Hypertext Transport Protocol (HTTP) application's process and address space. The DLL files are loaded into the computer when HTTP is started and remain there as long as they are needed; the DLL files do not have to be located and read into storage as frequently as a CGI application.

In a conventional testing environment, a number of software tools, implemented in one process, would be used to test an application, while other software tools, implemented in another process, would be used issue requests over a network communication link. Additional software tools would then measure different performance characteristics of the network application. For example, information from performance counters can be fed into a profiler tool which can separately analyze the performance counters.

By contrast, the PTEM 315 can provide all of this functionality in a single module.

The Performance Measurement Module (PMM) 317 measures information about the responses received from the network application module 330 and information about the code of the application (e.g., collects and interprets data about performance of the application). The PMM 317 can receive the responses from the network application module 330, analyze the responses to provide measurements relevant to testing. For instance, in some performance tests, the PMM 317 can analyze information in the responses to determine whether or not the responses include specific data that was requested (e.g., validate the responses). In other performance tests, the PMM 317 can analyze or measure how long the network application 330 takes to send responses back to the PMM 317 (e.g., how long it takes a response to come back from the 330). In still other performance tests, the PMM 317 can analyze how long it takes the network application 330 to iterate through the various requests (e.g., lists of URLs) that are coming from different User Instances 310. The Performance Measurement Module (PMM) 317 can also store measurements and compare them to prevent regressions in the performance of software. The Performance Measurement Module (PMM) 317 can allow software developers to quickly take measurements and use the results to make improvements to their software. In one implementation, the PMM 317 can include functionality which stops the testing process if certain metrics are detected or exceeded, and then run a debugging program to determine where glitches occur in the code of the network application module 330. As developers iterate this process, they can quickly improve the performance of their software.

The Performance Analysis Module (PAM) 319 can analyze the responses from the network application module 330, and provide metrics which characterize the performance of the network application module in response to the requests. In some performance tests, the PAM 319 can analyze and record various metrics associated with the responses from the network application module 330 during the course of performance testing of the network application network application module 330. These metrics correspond to certain quantities which reflect the performance of the network application 330. The PAM 319 can process the responses to perform any of the conventional testing or profiling functions which are conventionally performed when a network layer communication link is used in testing or profiling network applications. For instance, the PAM 319 can implement profilers and performance counters which can allow the PAM 319 to characterize the performance of the network application module 330. Examples of profiling functionality include, for example, measuring the number of requests/sec, memory utilization, thread context switches, CPU scaling, lock contention, robustness and reliability. In some performance tests, the PMM 317 can implement profiler functionality which analyzes code from the network application 330 and determines which parts of the code are taking the longest period of time to execute in the network application 330. The PMM 317 can also provide a breakdown of the amount of time being used to execute each portion of the code. In other performance tests, if the developer is concerned about memory usage, the PMM 317 can provide a breakdown of how the application is using memory to perform specific tasks. These performance tests can allow a developer to tweak their code to make the slower portions execute more quickly.

The PTEM 315 also includes an interface (not shown in FIG. 3) which allows conventional off the shelf (COTS) testing and profiling applications to be "plugged" into the PTEM 315 so that those testing and profiling applications can be used in conjunction with measurements taken by the PMM 317 and/or analysis results generated by the PAM 319.

Thus, the PTEM 315 can quickly measure performance by running a simple test.

Thus, according to the performance testing techniques and technologies described above a network application and at least one client user instance can implemented as part of a single user process on a single computer (e.g., the network application and the browser application are part of the same process within the same computer). Communication between the network application and client user instances takes place within a single user process and eliminates the need for transferring all of the user state information over a network layer or network communication link. As such, network application testing that would normally take place using a network application which communicates with client(s) user instances via a network protocol over an external network such as an intranet, the Internet, etc. can be simulated without implicating a network layer communication link. This greatly simplifies testing of network applications, such as Web server applications and database applications, by eliminating the need for setting up a network between the network application and the client(s) user instances.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. For example, the CUI module, PTEM and network application module could also execute in different processes on the same computer.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiments and implementations.

It should also be understood that various changes can be made in the function and arrangement of elements without departing from the scope of the invention as set forth in the appended claims and the legal equivalents thereof. For instance, any user interface (UI), schema or algorithm would be a specific implementation of the prediction or estimation concepts described above. As such, we claim as our invention all such embodiments as may come within the scope and spirit of the following claims and equivalents thereto. Thus, the present invention is not intended to be limited to the embodiments shown herein but is to be accorded the widest scope consistent with the principles and novel features disclosed herein.

What is claimed is:

1. A system for testing network applications within at least one process on a computer having a processing unit and memory, the processing unit executing computer-executable modules stored in the memory on the computer comprising:
   at least one client user instance (CUI) module associated with a client application on the computer and configured to execute in a single process on the computer, wherein each CUI module has state information associated therewith that can be used to simulate usage patterns of the client application when communicating with a network application using a network layer communication link;
   a Request Driver Module (RDM), wherein the RDM generates information requests based on the state information received from the at least one CUI; and
   a network application module implementing a network application for testing which is configured to communicate with the client application over the network layer communication link, wherein the network application module is configured to execute in the single process on the computer and to generate responses to the information requests which are received directly from the RDM without using the network layer communication link.

2. A system according to claim 1, wherein CUI modules make in-process function calls to the network application module via the RDM to simulate client communication with the network application module.

3. A system according to claim 1, wherein communication between the network application module and CUI modules takes place within the single process over a common application layer such that the network application module and each of the CUI modules communicate with each other without communicating over the network layer communication link.

4. A system according to claim 3, wherein
   the state information and the responses to the requests are communicated over the common application layer during testing of the network application module.

5. A system according to claim 1, wherein the RDM comprises a multi-threaded RDM configured to receive the state information from a plurality of CUI modules, process the state information, and generate requests corresponding to the state information from the plurality of CUI modules.

6. A system according to claim 1, wherein the CUI module comprises:
   at least one client browser user instance (CBUI) module.

7. A system according to claim 1, wherein the network application comprises:
   an application which is configured to receive HTTP requests over the network layer communication link when operating in a network environment.

8. A system according to claim 7, wherein the network application module comprises:
   a Web server application module.

9. A system according to claim 8, wherein the state information comprise a list of URLs and other information which a client Web browser application would send to a Web server as part of an HTTP request, wherein the state information simulates usage patterns within a client Web browser application as a user reviews a number of different hyperlinks.

10. A system according to claim 9, wherein the information requests comprise HTTP requests which simulate HTTP requests that would be sent to a Web server executing a Web server application module, and wherein the responses comprise responses of the Web server application module to the HTTP requests.

11. A system according to claim 1, wherein the network application module comprises:
    a database application module.

12. A system according to claim 11, wherein the state information comprises:
    queries which simulate usage patterns within a client database browser application.

13. A system according to claim 12, wherein the information requests comprise:
    database requests which simulate database requests that would be sent to a database server executing a database application.

14. A system according to claim 1, wherein the network application module is configured to:
    automatically read configuration information for the CUI module and configuration information about the network application module;
    process different requests provided from the RDM module to generate responses; and
    send the responses to a performance testing engine module (PTEM).

15. A system according to claim 14, wherein the PTEM is configured to receive the responses from the network application module and to process the responses to perform at least one testing function.

16. A system according to claim 14, wherein the PTEM is configured to analyze information in the responses to determine whether the responses include specific data that was requested.

17. A system according to claim 1, further comprising:
    a performance measurement module (PMM) configured to:
      measure different performance characteristics associated with the responses from the network application module which characterize the performance of the network application module, and
      provide measurements relevant to testing.

18. A system according to claim 17, wherein the PMM module is configured to determine:

a first amount of time indicating how long the network application module takes to send responses, and a second amount of time indicating how long the network application module takes to iterate through the requests.

19. A system according to claim 17, further comprising:

a performance analysis module (PAM) configured to:

analyze the responses from the network application module, and provide metrics which characterize the performance of the network application module in response to the requests.

20. A method for testing network applications within at least one process on a computer, the method comprising:

receiving, within a single process on the computer, state information associated with a client application on the computer that can be used to simulate usage patterns of the client application when communicating with a network application using a network layer communication link;

generating, within the single process on the computer, information requests based on the state information to simulate communication of the client application to the network application using the network communication link;

communicating, within the single process on the computer, the information requests within an application layer without communicating over the network layer communication link to a network application on the computer which is configured to communicate with the client application over the network layer communication link; and generating, within the single process on the computer, responses to the information requests.

* * * * *